ID: 3,961,918

METHOD AND APPARATUS FOR DEGASSING LIQUIDS

This is a continuation of application Ser. No. 236,033, filed Mar. 20, 1972, now abandoned.

BACKGROUND OF THE INVENTION

The present invention relates generally to an improved method and apparatus for removing entrained and dissolved gases from liquids and more specifically to an improved method and apparatus for deaerating solutions used in connection with artificial kidney dialysis machines and in connection with water purification systems such as reverse osmosis systems.

Although there are a variety of needs for solutions in which the dissolved gases have been removed, one of the primary uses for such a solution is in connection with artificial kidney dialysis machines. A frequent problem encountered by many hospitals in the northern United States and Canada arose because of the presence of dissolved gases in the cold water in these areas which was used in the preparation of the dialysate for use in artificial kidney units.

The dialysate is the physiological salt solution which passes through the dialyzer portion of the kidney unit and "rinses" wastes from the blood. The preparation of the dialysate includes heating the water to body temperature after which the warm solution flows through the dialyzer where the turbulence releases the dissolved gases. Because the dialysate still contained many dissolved gases, it was necessary to install a bubble catcher in the blood line between the dialyzer and the patient in order to trap air bubbles. However, such a bubble catcher had to be evacuated every five to ten minutes throughout the ten to fourteen hour dialysis treatment to prevent air emboli from entering the patient. This was an extremely difficult and demanding task which if not accomplished could be fatal to the patient. Consequently, there is an extreme need for an apparatus which would be able to efficiently and economically remove dissolved and entrained gases from solutions. In the past, other attempts at removing dissolved gases from solutions have included heating the solution and exposing the solution to ultrasonic energy. None of these attempts, however, have been successfully applied in the preparation of air free dialysate for use in kidney machines.

A second application for the present invention is in connection with water purification systems such as reverse osmosis systems which normally remove over 90% of the dissolved salts in a solution but which passes most of the dissolved gases. Also, many technical and industrial processes require a gas free solution since dissolved gases can interfere with mixing, upset flow and often impart unusual reactions.

SUMMARY OF THE INVENTION

In contrast to the prior art, the present invention does not utilize heat, ultrasonic energy, or other means currently used to remove dissolved gases from solutions. Rather, the present invention provides an improved apparatus and method for efficiently and economically removing dissolved and entrained gases from solutions. With the present invention, the solution containing dissolved gases is introduced into a degassing chamber and exposed to a surface of a degassing member composed of a finely entwined and porous material which allows the solution to pass through but which causes the dissolved air and gases to be released from the solution in the form of thousands of tiny bubbles which coalesce on the surface of the degassing member. When the collected gas bubbles become sufficiently large, they rise to the top of the degassing chamber and are discharged. When the present invention is used in the preparation of air free dialysate for use in connection with kidney dialysis units, patients can be dialyzed ten to fourteen hours at a time without fear of air bubbles entering the blood. Thus, in addition to increased efficiency and safety, numerous personnel hours are saved.

Accordingly, it is an object of the present invention to provide an improved method and apparatus for removing dissolved gases from solutions.

Another object of the present invention is to provide an improved method and apparatus for removing dissolved gases from solutions without the use of heat or ultrasonic energy.

Another object of the present invention is to provide an improved method and apparatus designed to be used in connection with the preparation of dialysate for use in artificial kidney machines for preventing the injection of air bubbles into the blood stream of the patient.

Another object of the present invention is to provide an improved method and apparatus for removing dissolved gases from solutions which utilizes a unique degassing member which allows the solution to pass through but which causes the dissolved and entrained gases to coalesce at the surface of the member where they are collected and discharged.

A further object of the present invention is to provide an improved method and apparatus for removing dissolved gases from solutions which permits artificial kidney patients to be dialyzed 10 to 14 hours at a time without fear of air bubbles entering the blood.

These and other objects of the present invention will become apparent with reference to the drawings, the description of the preferred embodiment, and the appended claims.

DESCRIPTION OF THE PREFERRED EMBODIMENT

Figure 1:
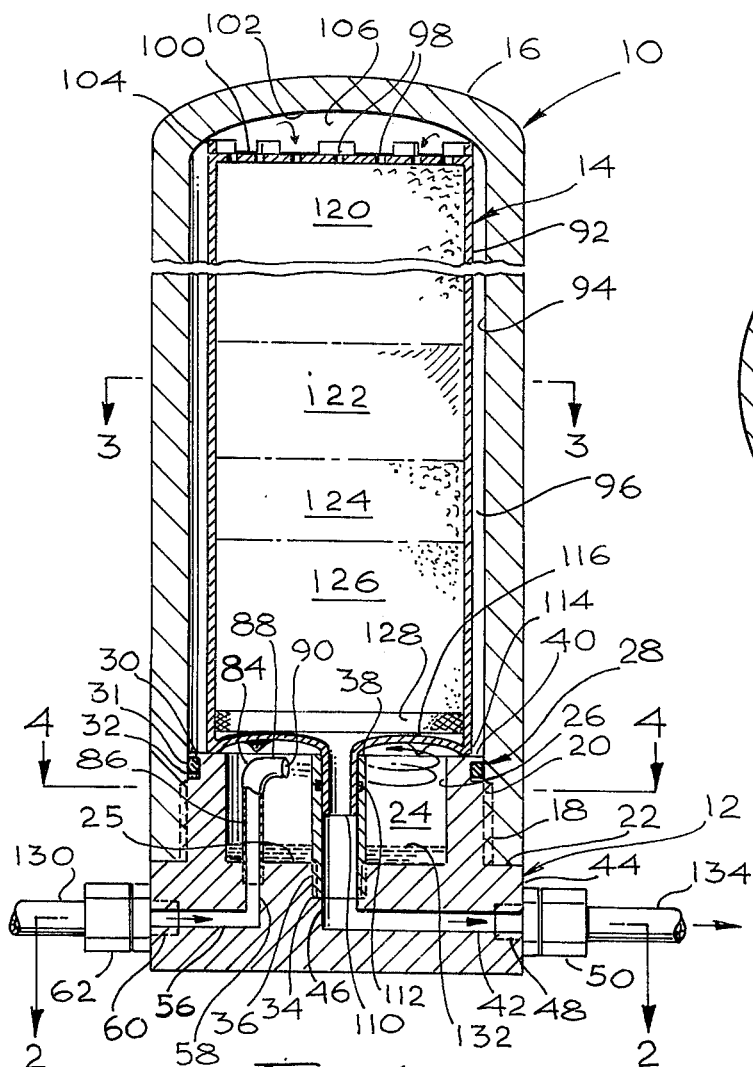
FIG. 1 is a cross sectional view of the improved degasser of the present invention.
Figure 2:
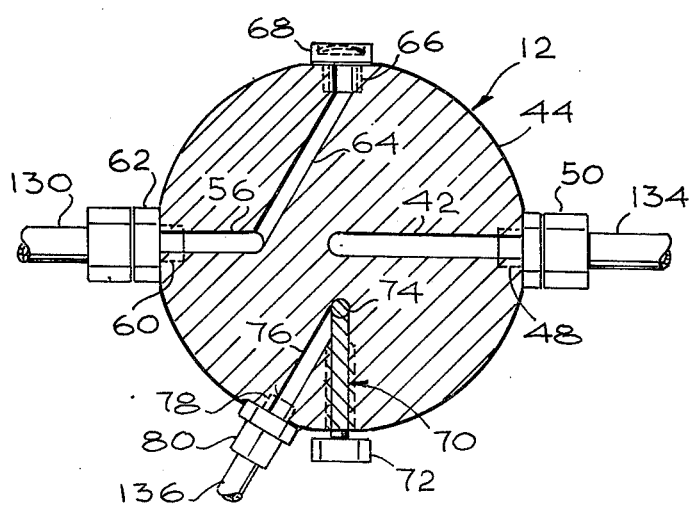
FIG. 2 is a cross sectional view of the improved degasser of the present invention taken along the line 2—2 of FIG. 1.

Referring first to FIGS. 1 and 2, the improved depassing apparatus 10 of the present invention includes generally a base 11, a casing 12 defining a degassing chamber 18 and a degassing member or cartridge 14 adapted to remove entrained and dissolved gases such as air, oxygen, nitrogen, carbon dioxide, etc. from a liquid.

More specifically, the base 11 includes an inlet port 15 connected with a degassing chamber 18 by an inlet conduit 16, and an outlet port 19 connected with a second chamber 17 inside of the degassing member 14 by an outlet conduit 20. It should be noted that each of the ports 15 and 19 contain internal threads 21 and 22 respectively enabling connections to be made between the ports 15 and 19 and auxiliary equipment in order to supply liquid containing entrained and dissolved gases to the degassing chamber 18 and to remove the deaer- U.S. Patent  June 8, 1976  3,961,919

GAS-VAPOR SEPARATING AND GAS PURIFYING APPARATUS

BACKGROUND OF THE INVENTION

1. Field of the Invention

This invention relates to the field of gas purifying apparatus and, more particularly, to combination gas-vapor separating and gas purifying apparatus.

2. Description of the Prior Art

Compressed air (or gas) for self-contained respiratory air systems, such as are commonly used by fire departments and scuba divers, and for other critical applications, must be virtually free from vapor and from particulate and chemical contaminates. In addition to the moisture and contaminants, such as dust and carbon monoxide or carbon dioxide, initially present in the air or gas before compression, other impurities, such as oil vapor from the compressor and particulate matter from the filter media, may be introduced by the compressing and purifying operations. In many instances, when used for breathing, the purified air or gas must meet stringent quality standards promulgated by the Occupational Safety and Health Administration (OSHA) of the federal government.

Purification is normally accomplished by first passing the compressed air or gas through vapor separators, for removal of water and oil vapor from the compressor, and then through filters which remove residual vapor and particulate and chemical contaminations. The filters used may be simple, having only a dessicant for removal of moisture, or may include such other materials as catalysts to convert carbon monoxide into carbon dioxide and activated carbon (charcoal) to remove chemical impurities. Mechanical sieves may be provided for removal of particulate impurities. Examples of filtering apparatus are disclosed by Robbins (U.S. Pat. Nos. 3,029,581 and 3,047,993), Jaubert (U.S. Pat. No. 2,698,061), Squier (U.S. Pat. No. 2,728,407), Gibson, Jr. (U.S. Pat. No. 3,008,540) and Sperlock (U.S. Pat. No. 3,127,257).

When, as is often the case, substantial quantities of vapor, including water and oil vapor, are present in the compressed gas or air, a separate element for removing the vapor is normally provided to prevent saturation of the filter. Thus, two separate "filters" are normally used in series, the first being a mechanical-type vapor separator to separate out most of the vapor and the second containing the filtering media to remove residual vapor and other impurities.

Jaubert discloses a single unit having a baffle-type moisture separator and having a separate filter element for removing impurities in the gas, the incoming pressurized gas passing first through the baffles and then through the purifying elements. However, the disclosed baffle arrangements are comparatively costly to fabricate and difficult to clean and are not particularly effective in vapor separation.

Heretofore, to the applicant's knowledge, there exists no simple, efficient and comparatively low-cost combination gas-vapor separating and gas purifying apparatus.

SUMMARY OF THE INVENTION

A combination gas-vapor separating and gas purifying apparatus comprises a pressure vessel having a vapor separating chamber formed in a base portion thereof, and having disposed within portions of the vessel above the separating chamber a gas purifying means. A generally annular passageway, formed between the outside of the purifying means and the inside of the vessel, communicates in a lower region with the separating chamber and in an upper region with a gas permeable portion of the purifying means. Vortexing means are provided for causing a mixture of pressurized gas and vapor introduced into the vessel to vortex around the separating chamber and upwardly around the annular passageway adjacent the purifying means to cause centrifugal separation of vapor from the gas. Vapor condensing on the vessel and purifying means walls is gravity-collected in the lower portion of the separating chamber. Means are provided for connecting a lower portion of the purifying means to an outlet passageway to the vessel for flow of the purified gas from the vessel.

More particularly, the vessel comprises an elongate cylindrical tank closed at the top and open at the bottom. A base member, threadably received within the lower tank opening, is removable to allow replacement of the purifying means. A cylindrical vapor separating chamber is formed in an upper portion of the base member. The purifying means comprises a cylindrical purifying element having a permeable upper portion and an open-ended projection at the bottom portion. A tubular connecting element is disposed along the axis of the separating chamber and connects the purifying element projection with an outlet passageway in the base member, thereby causing the separation chamber to be annular in configuration.

The vortexing means comprises a formed vortex tube having a vertical inlet portion received in the bottom of the separating chamber and connected to an inlet passageway through the base member and having a horizontal outlet portion directed tangentially along the outer wall of the separating chamber and in a plane generally at right angles to the axis of the chamber.

A drain passageway, formed through the base member to communicate with the lower portion of the separating chamber, enables condensed vapor to be withdrawn therefrom by means of a drain valve. Over-pressure protection is provided by a burst diaphragm which communicates with the inlet passageway of the base member through another passageway in such member.

Mechanical separation, by centrifuge action, of vapor present in a pressurized gas is provided in the same tank in which subsequent purification of the gas is accomplished by passing the gas downwardly through a purifying element. The purifying element may contain a plurality of purifying media such as silica gel for removal of residual vapor, a catalyst to convert carbon monoxide to carbon dioxide, activated carbon to remove chemical impurities, including carbon dioxide, and a mechanical sieve to remove particulate impurities. Gas purifying is thus made more simple and less costly than with heretofore available purifying apparatus.

BRIEF DESCRIPTION OF THE DRAWINGS

Figure 3:
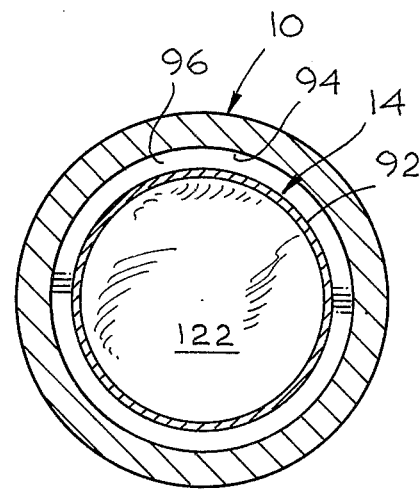
FIG. 3 is an expanded perspective view of the degassing member of the present invention.
Figure 4:
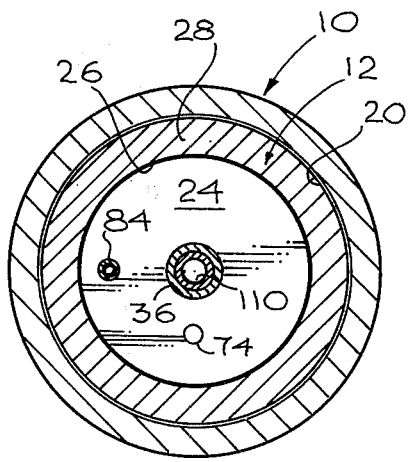

A better understanding of the invention may be had from a consideration of the following detailed description, taken in conjunction with the accompanying drawings, in which:

FIG. 1 is a vertical sectional view of the apparatus, showing the tank, purifying element and base;

FIG. 2 is a sectional view along line 2—2 of FIG. 1, showing the inlet, outlet, drain and pressure relief passageways through the base member;

FIG. 3 is a sectional view along line 3—3 of FIG. 1, showing the annular vapor separating chamber in the base member; and FIG. 4 is a sectional view along line 4—4 of FIG. 1, showing the annular passageway between the purifying element and the inside of the tank.

DESCRIPTION OF THE PREFERRED EMBODIMENT

As best seen in FIG. 1, the gas-vapor separating and gas purifying apparatus comprises generally a single pressure vessel or tank 10, a base member 12 threadably received in the open lower end of the tank and a gas purifying element or cartridge 14 disposed within the tank.

More specifically, the tank 10, formed in an elongate, cylindrical shape, has a conventionally domed, closed upper end 16 and an open lower end which is internally threaded at an end portion 18. To enable withstanding of pressures up to about 4500 psi, and to meet safety standards requiring about a 4 to 1 safety factor while still remaining comparatively lightweight, the tank 10 is preferably impact extruded from a strong lighweight material such as type 6351-T6 aluminum alloy, which is hard annodized to inhibit corrosion. The tank may be about 16 inches long and about 4.6 inches in diameter with a 0.70-inch wall thickness.

To close the open lower end of the tank 10, and to admit the purifying element 14, the base member 12 is formed to have an elongate upwardly projecting portion 20 which is externally threaded for screwing into the tank end portion 18. Below the portion 20, the base member 12 has a flanged lower portion 22 which has approximately the same outer diameter as the outside diameter of the tank 10. An inner portion of the base member 12 is axially bored to form a cylindrical chamber 24 having an outer peripheral wall surface 26. The depth of the chamber 24 is approximately equal to the length of the threaded portion 20, and may be about 2.55 inches; the diameter of the chamber, which may be about 2.18 inches, is smaller than the inner diameter of the tank 10 to provide a strong chamber wall 28. An annular groove 30 is formed around an upper, outer region of the portion 20 above the threads. To effect pressure sealing, upon assembly of the base portion 12 into the tank 10, an O-ring 31, having a backup ring 32, is installed in the groove.

An axial depression 34 is bored partially through the base member 12 from the bottom of the chamber 24, and is internally threaded to receive a tubular filter connecting element 36, which is externally threaded in a lower region. When the connecting element 36 is installed in the depression 34, an upper surface 38 of the element is at about the level of an upper surface 40 of the base member wall 28. The connecting element 36 causes the chamber 24 to be generally annular in configuration, and the chamber may be referred to as an annular, rather than a cylindrical chamber.

As also seen in FIG. 2, a radial outlet passageway 42 is formed through a side wall surface 44 of the base member lower portion 22. The inner end of the passageway 42 communicates with the bottom of the depression 34 by means of a short vertical portion 46. An outer end portion 48 of the passageway 42 is threaded to receive a conventional threaded tube fitting 50. In an imposing relationship, an inlet passageway 56 is radially formed in the base member lower portion 22 and has a short vertical portion 58 which communicates with a bottom surface 60 of the chamber 24. An outer portion 60 of the outlet passageway 56 is threaded to receive a conventional tube fitting 62.

Also formed in the lower portion 22 of the base member 12 is a pressure relief passageway 64 (FIG. 2) which is angled from a pressure relief port 66, spaced midway between the outer portions 48 and 60 of the passageways 42 and 56, to communicate with an inner portion of the inlet passage 56. The port 66 is threaded to receive a pressure relief device 68 which may be a burst disc or diaphragm having a burst pressure somewhat above the intended operating pressure of the tank 10 and well below the proof or burst pressure of the tank.

Opposite the port 66, and communicating radially through the base member lower portion 22 is a threaded opening 70 for receiving a drain valve 72. An inner end 74 of the opening 70 communicates with the bottom surface 60 of the chamber 24 by means of a short vertical bore (not shown), Angled into an inner portion of the opening 70 is a drain passageway 76 having an outer drain port 78 threaded to receive a conventional tube fitting 80.

A vortexing action of gas and vapor into the chamber 24, from the inlet passageway 56, is provided by a tubular vortexing element 84 which has a lower vertical portion 86 threadably received within the upper portion 58 of such inlet passageway (FIG. 1). A short upper, horizontal portion 88 of the vortexing element 84 has an outlet opening 90 which is somewhat below the upper surface 40 of the base member 12, and which is directed to emit gas and vapor tangentially along the chamber wall surface 26 and in a plane generally perpendicular to the axis of the tank 10. Pressurized gas and vapor exiting through the outlet opening 90 are thereby caused to vortex or swirl around the chamber 24 to separate vapor from the gas, as more particularly described below, before the gas enters the purifying element 14.

The purifying element 14 is formed with a rigid outer cylindrical surface 92 having a somewhat smaller diameter than an inner diameter surface 94 of the tank 10, thereby forming, when the element is installed in the tank, an annular passageway 96 between the surfaces 94 and 96 (FIGS. 1 and 3). A plurality of gas admitting perforations 98 are formed in a flat upper end surface 100 of the purifying element 14. The upper surface 100 is maintained in spaced relationship with a concave top inner surface 102 of the tank 10 by an annular spacer 104 having a plurality of radial openings or cutouts (not shown) to admit gas from the annular passageway 96 to an upper chamber 106 formed between such surfaces.

An open-ended elongate tubular portion 110 at the bottom of the purifying element 14 projects axially downwardly and, when the purifying element is installed in the tank 10, extends into the connection element 36, and may be sealed therein by an annular seal or O-ring 112. A plurality of downwardly projecting edge portions 114, along the outer edge of a bottom 116 of the purifying element 14, supports the purifying element upon the base member upper surface 40. Such projections 114 are spaced apart to allow flow of gas therebetween from the chamber 24 into the annular passageway 96.

Packed within the purifying element 14 may be a composite of various filtering or purifying media corresponding to the purifying function to be performed. For example, a first or upper layer 126 may be formed of activated alumina to remove residual oil vapor from the gas. A next layer 122 may comprise silica gel to remove residual water vapor from the gas. Another layer 124 may comprise a catalyst, for example, Hopkolite, for converting carbon monoxide to carbon dioxide. Still another layer 126 may comprise activated carbon (charcoal) to remove chemical impurities, including the carbon dioxide. At the bottom of the purifying element, adjacent the projecting portion 110, a mechanical filter or sieve 128 may be positioned to remove particulate matter either initially present in the gas or which may have been introduced during the compression or purifying operations (for example, particles of silica gel or activated carbon). The purifying element 14 may be prepacked with such various purifying media and may be completely disposable, or it may be segmented in a manner (not shown) enabling disassembly and recharging of the purifying media.

Operating of the apparatus is generally evident from the foregoing description. Pressurized gas, which may contain chemical and particulate impurities as well as water and oil vapor, is directed into the apparatus through an inlet tube 130 which is connected to the fitting 60 threaded into the inlet passageway 56. The unpurified gas-vapor mixture is ejected through the opening 90 of the vortex element 84 and is caused to vortex or swirl around the annular chamber 24 and then vortex upwardly around the annular passageway 96. During such vortexing, substantially all of the water and oil vapor is centrifugally separated from the gas and is condensed on the walls 26 and 94 and collected as a liquid 132 at the bottom of the chamber 24. The gas, now containing only residual amounts of oil and water vapor, passes from the passageway 96 through the annular spacer 104 into the upper chamber 106 and thence through the perforations 98 downwardly into the purifying element 14. As the gas is forced downwardly through the purifying element 14, the residual vapor and the impurities in the gas are removed by the filtering media 122–128 and the completely purified gas exits the filter through the open-ended projecting portion 110 and, via the connecting element 36, outwardly through the outlet passageway 42 and to a tube 134 connected to the tube fitting 50. From the tube 134 the purified gas may be directed, for example, to a storage cylinder (not shown).

Periodically, the drain valve 72 is opened, either manually or otherwise (if it is a remotely actuated valve) and the liquid 132 is gravity drained or forced by pressure in the tank 10 out through the passageway 76 and through a tube 136 connected to the fitting 80 to a convenient receptacle (not shown).

In the event pressure of the gas entering the base member 12, via the inlet passageway 56, exceeds the preselected burst pressure of the burst disc 68, the disc ruptures and allows the gas to exit via the passage 64, thereby preventing possible high pressure and dangerous rupturing of the apparatus. The burst disc 68 may be replaced by a pressure relief valve, not shown, or a pressure relief valve may be installed in addition to the burst disc elsewhere on the apparatus. In the event that a pressure relieve valve is provided in addition to the burst disc 68, the relief pressure would preferably be set at a somewhat lower pressure than the burst pressure of the burst disc.

Both gas-vapor separation, principally by mechanical means, and subsequent gas purification is efficiently provided in a single unit having a replaceable purifying element. By use of such apparatus, necessity for having a separate vapor removing unit is avoided and system complexity is reduced. If added filtering capacity is desired, several identical or similar units may be connected in series. When a plurality of the described apparatus is series connected, it is necessary that all have burst disc 68 and drain valve 72. The related openings 66, 70 and 78 may be plugged, or if desired different base members 12 may be provided for other than the first unit in the series. For example, a base member may be formed without the chamber 24 and vortexing element 84 and without described provisions for pressure relief and draining. Use of such modified base members may reduce overall systems costs; however, advantages associated with having a gas-vapor separator and gas purifying element in the same unit will thereby be reduced.

Although there have been described hereinabove specific arrangements of a gas-vapor separating and gas purifying apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A combination gas-vapor separating and gas purifying apparatus, which comprises:

a. a pressure vessel having a closable opening, a base portion of said vessel having formed therein a vapor separating chamber in communication with other portions of the inside of said vessel, said base portion also having formed therein inlet, outlet and drain passages, said inlet passage communicating through said base portion with said separating chamber, said outlet passage communicating through said base portion with an inside portion of said vessel, said drain passage communicating through said base portion with said separating chamber;

b. purifying means adapted for purifying a gas, said purifying means including a removable purifying element disposed within said vessel and installable through said closable opening, said purifying element having a gas permeable upper portion and an open lower portion, and being formed to provide a generally annular passageway between outer portions thereof and adjacent inside portions of said vessel from said separating chamber to said permeable upper filter portion;

c. means for connecting said lower open portion of said filter to said outlet passage; and d. vortexing means for causing a pressurized mixture of gas and vapor supplied to said base inlet passage to vortex around said separating chamber and upwardly around and through said annular passageway to cause separation of said vapor from said gas by centrifugal action, substantially vapor-free gas being passed to said permeable portion of said purifying element and liquefied, separated vapor being collected in said separating chamber.

2. The invention as claimed in claim 1, wherein said purifying element has disposed therewithin a plurality of gas purifying media for causing removal of residual vapor from said gas passed to said permeable portion and for removing from said gas particulate matter and preselected gaseous impurities.

3. The invention as claimed in claim 1, wherein said vortexing means includes a tube having an inlet end portion communicating with said inlet passage and an outlet end portion positioned relatively adjacent to the outer periphery of said separating chamber and in a plane generally at right angles to the longitudinal axis of said separating chamber.

4. The invention as claimed in claim 1, wherein said vessel and said purifying element are generally cylindrical.

5. The invention as claimed in claim 1, including a drain valve connected to said drain passage.

6. The invention as claimed in claim 1, wherein said means for connecting said lower open portion of said purifying element to said outlet passage comprises a tubular element disposed along the axis of said separating chamber, whereby said separating chamber is caused to be annular in configuration.

7. The invention as claimed in claim 1, including pressure limiting means communicating through said base portion with said separating chamber, whereby to limit pressure in said vessel to below a predetermined pressure level.

8. The invention as claimed in claim 7, wherein said pressure limiting means includes a pressure diaphragm having a burst pressure at said predetermined pressure level.

9. The invention as claimed in claim 1, wherein said closable opening is at the bottom of said vessel and said base portion comprises a removable member threadably received in said closable opening.

10. A gas-vapor and gas purifying apparatus, which comprises:
   a. a cylindrical tank,
      said tank having a closed upper end and an open lower end portion, said lower end portion being internally threaded;
   b. a base member,
      said base member having an externally threaded upper portion received by said internally threaded lower end portion of said tank,
      said base member having axially formed in an upper portion thereof a cylindrical vapor separating chamber, and having formed in lower regions thereof inlet, outlet and drain passageways communicating with said chamber;
   c. purifying means replaceably disposed within said tank and adapted for purifying a gas,
      said purifying means including a cartridge having disposed therein purifying media, said cartridge having a gas permeable upper end portion adapted for receiving a gas to be purified and a lower opening adapted for emitting a purified gas and being formed to provide, when disposed within said tank, an annular spacing between an outer wall thereof and an inner wall of said tank, and an upper chamber between said upper end portion thereof and an inner surface of said closed end of said tank,
      said annular spacing communicating at a lower region with said separating chamber and an upper with said upper chamber;
   d. means for connecting said lower opening of said cartridge with said outlet passageway in said base member for a flow of purified gas therebetween,
      said means including a tubular member positioned to cause said separating chambers to be generally annular in configuration;
   e. vortexing means adapted for causing a mixture of gas and vapor entering said separating chamber from said inlet passageway to vortex around said separating chamber and around said annular spacing between said cartridge and said tank, whereby to cause vapor separation from the gas vapor mixture by centrifugal action; and
   f. drain means adapted for draining condensed vapor from said separating chamber.

11. The invention as claimed in claim 10, wherein said drain means includes a drain valve connected to said base member and communicating therethrough to a lower portion of said separating chamber, whereby condensed vapor may be drained from said separating chamber.

12. The invention as claimed in claim 10, including pressure limiting means for preventing pressure in said tank from exceeding a predetermined level.

13. The invention as claimed in claim 12, wherein said pressure limiting means includes a diaphragm adapted for bursting at about said predetermined pressure level.

14. The invention as claimed in claim 13, wherein said diaphragm is connected to said base member and communicates therethrough with said inlet passageway.

15. The invention as claimed in claim 10, wherein said vortexing means comprises a tube having an inlet portion connected to said base member and to said inlet passageway where said inlet passageway opens into said separating chamber, and having an outlet portion directed along an outer wall of said separating chamber in an upper region thereof, said outlet portion being positioned in a plane substantially at right angles to the axis of said chamber.

16. The invention as claimed in said claim 10, wherein said cartridge includes means for refilling said cartridge, whereby exhausted purifying media may be replaced with fresh purifying media.

17. The invention as claimed in claim 10, wherein said purifying means includes means for removing residual vapor from said gas and includes means for removing particulate matter from said gas.

18. The invention as claimed in claim 17, wherein said purifying media further includes means for converting carbon monoxide impurities in said gas into carbon dioxide, and means for absorbing said carbon dioxide.

* * * * *